Jan. 22, 1935.  H. S. LIDDICK  1,989,060
BOTTLE ATTACHMENT AND METHOD OF MAKING THE SAME
Filed March 18, 1933
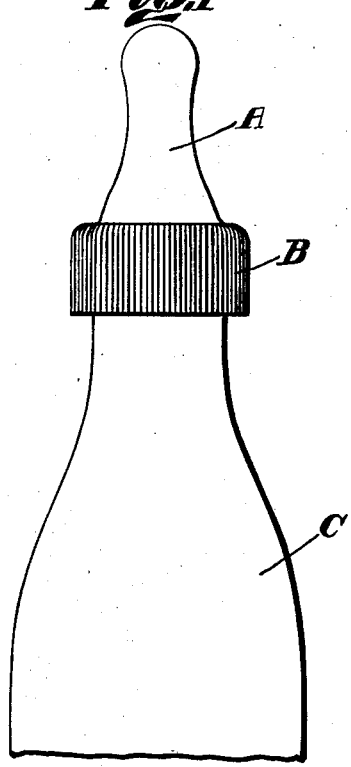
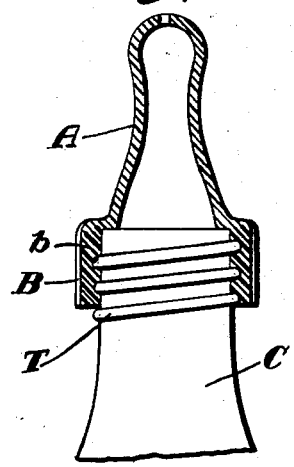
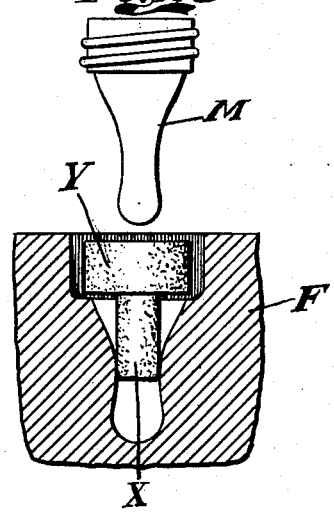
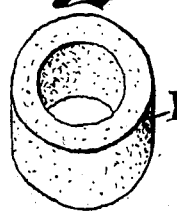
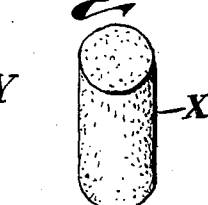
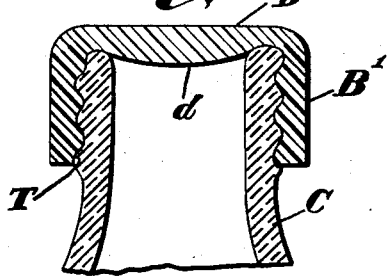
Inventor
Harold S. Liddick
By Attorney Patented Jan. 22, 1935

1,989,060

UNITED STATES PATENT OFFICE 1,989,060

BOTTLE ATTACHMENT AND METHOD OF MAKING THE SAME

Harold S. Liddick, Belmont, Mass., assignor to Davidson Rubber Company, Boston, Mass., a corporation of Massachusetts Application March 18, 1933, Serial No. 661,526

3 Claims. (Cl. 128—252)

My present invention relates to the manufacture of certain novel rubber structures, notably nursing nipples or like bottle attachments, as for example, closures for nursing bottles prior to use where a formula has been made up in advance for several feedings. Nursing bottles have heretofore been made with simply a flanged mouth over which the soft rubber nipple is sprung.

In such articles it is necessary to have a soft, flexible or pliant part and also it has been urgently necessary that the attachment between appliances and container be inflexible or relatively less flexible so that a positive basis of interengagement be provided.

Taking the nursing or feeding nipple as illustrative, we have an instance where the nipple proper is necessarily a flexible soft member of relatively pure rubber and when engaged with the bead of the bottle mouth by a flexible elastic base was liable to dislodgment causing air or milk leakage.

The great difficulty in such articles has been that the mechanical manipulation of the sac or teat has caused strains in the rubber at the zone of interengagement between the attachment and the container against which the old elastic basis of attachment did not afford protection.

This has resulted in many proposed mechanical combinations such as metallic clamping structures, but without practical effective relief from the difficulties of the old nipples and with the disadvantage of separate nipple pieces.

My invention contemplates novel nipples and like articles and a novel basis of producing integral rubber attachments in which a nipple may be made of the desired soft pliant rubber and the bottle thread or interengaging portion made of slightly compressible but sturdy, stiffer or more rigid rubber stock or mixture. This according to my concept permits the combination in the nursing bottle of such a nipple on the basis of a threaded or like positive attachment.

By my system of integration I produce an integral rubber article without joints or clamps but in its integrality differentiated as to its several parts. These while integral and in a sense homogeneous have their own individual characteristics so that while the attachment can function as a unit and an article as a whole, its individual parts have their own specialized characteristics and functions without conflict with the other portions or areas.

In the illustrative nursing nipple the whole is an integral molded rubber unit. It is homogeneous as far as its rubber characteristic is concerned. It is differentiated as to the soft pliant practically pure rubber nipple for the infant's mouth and the relatively stiffer thread bearing engaging base portion for the bottle mouth.

In the accompanying drawing I have illustrated certain forms of my invention and indicated a method of fabricating such articles as follows:

Fig. 1 is an elevation of a nipple with my invention on a bottle mouth.

Fig. 2 a sectional view of such a nipple.

Fig. 3 a partly sectioned view of a die and plunger indicating the formation of such an article.

Fig. 4 a view of the rubber ingot of the base portion.

Fig. 5 a similar view of the nipple ingot, and

Fig. 6 is a view of a nursing bottle cap.

Referring to Figs. 1 and 2, the nipple therein shown consists of a soft pliant rubber nipple portion A and a relatively stiff or more rigid attaching portion B having a rounded thread as at b for engagement with the threads T of the container C.

As is attempted to be illustrated in the section of Figs. 2 and 6, the articles while consisting of the two different mixes of the same kind of rubber are a unitary integral article. These I form as indicated in Fig. 3.

In this figure I have shown a male mold member M and a female mold F having a suitable cavity to form the desired type of nippled attachment. In the cavity F I place ingots such as X and Y shown in Figs. 4 and 5. The ingot X in the form shown is a simple cylindrical body of relatively soft and comparatively pure rubber. As shown it is intended as the nipple or teat material. The ingot Y is preferably formed as a rough washer or short tubular body and of relatively stiffer or less elastic rubber mixture which may preferably contain a certain amount of fibre or other stiffening filler. This gives a stiffer body capable of carrying threads without stripping.

The two ingots are pressed together into the mold and vulcanized. In this process the two portions are integrated by what might be termed an autogenous welding action. The two parts each consisting of a rubbery material merge and become an integral article or unitary nipple. Such nipples may be made with strong and relatively stiff or rigid attaching portions B while the nipple proper or teat portion A may be soft and pliant and adapted for use in the infant's mouth.

The rubber mix for the attaching portion while relatively stiffer is sufficiently resilient to adapt itself to variations in glassware and of sufficient rigidity to allow it to be screwed down firmly on to bottle mouth, thus forming a tight seal between shoulder E and the top of container when so desired.

In Fig. 6 I have indicated an attachment of nursing bottle closure type in which a softer cushion disc D is combined with a relatively stiff or stiff or less elastic base or attaching portion B¹ with which the softer and more elastic portion D has been integrated as described in connection with the nursing nipple of Figs. 1 and 2.

The disc D preferably has a sealing bulge or contour d which by reason of its greater softness and compressibility may be tightly compressed on the mouth of the bottle C after filling. It also preferably has a considerable flexibility to permit expansion or contraction of the air or milk where it is mixed hot or sterilized. Even where made very thin and pliant, it is, like the soft teat member A, protected by the more rigid base B¹.

The base B¹ as in the case of the base B is sufficiently elastic or resilient as to its thread engaging portion to give a good grip and tight seal on the threads T so that the bottle is tightly closed even if the cap be not fully seated. Also on account of the spiral gasket effect of the interengagement it does not matter if the threads on the bottle neck are somewhat longer than the nipple or cap base. In other words, the base portions B and B¹ are capable of intimate contact with such threads or like parts and will adapt themselves to any ordinary variations in form such as so often occur in making glassware.

The character of the rubber or rubber mixes may obviously be varied in accordance with my invention to get the desired results as indicated. Different manufacturers and different rubber men may vary it to suit their special needs or technique.

In these illustrative types and others too numerous to mention, but which will be obvious to those skilled in the arts, there is made possible for the first time unitary rubber articles homogeneous throughout to the extent that they are rubber but completely differentiated in their respective mechanical parts by different characteristics, notably those of relative softness or rigidity or flexibility or other characteristics or degree of quality or character that may be desired in the combination. The articles may be produced rapidly and cheaply by my method as described in connection with Figs. 3, 4 and 5, which method may, of course, be elaborated or modified over the simple form shown, to give any desired manufacturing facilities needed for the nipples or other articles to be produced.

What I therefore claim and desire to secure by Letters Patent is:—

1. An integral nursing nipple for a container having retaining members about its mouth engageable upon rotation of the nipple, and comprising a soft flexible nipple portion, and a bottle engaging portion all of homogeneous soft rubber, said engaging portion having a fibrous material incorporated in its rubber to reduce its elasticity without destroying its flexibility whereby interengagement between nipple and container may be maintained.

2. An integral nursing nipple for a container having retaining members about its mouth engageable upon rotation of the nipple, and comprising a soft flexible nipple portion, and a bottle engaging portion all of homogeneous soft rubber, said engaging portion having vegetable fibre mixed with its rubber to reduce its elasticity without destroying its flexibility whereby interengagement between nipple and container may be maintained.

3. A unitary closure article of homogeneous rubber comprising a thin soft compressible part and a container engaging part having portions coactive with retaining members about the container mouth upon rotation, the soft rubber of the container engaging part having a vegetable fibre mixed with its soft rubber to reduce its elasticity and assure the effectiveness of the engagement without destroying its flexibility.

HAROLD S. LIDDICK.